United States Patent [19]

Yasuda et al.

[11] Patent Number: 5,046,946

[45] Date of Patent: Sep. 10, 1991

[54] PROCESS FOR FIRING CERAMIC SHAPED BODIES AND A TUNNEL KILN USED THEREFOR

[75] Inventors: Keiji Yasuda, Aichi; Koji Ogura, Chiryu; Kazuhiro Miyahara, Nagoya, all of Japan

[73] Assignee: NGK Insulators, Ltd., Japan

[21] Appl. No.: 555,796

[22] Filed: Jul. 23, 1990

Related U.S. Application Data

[63] Continuation of Ser. No. 330,906, Mar. 31, 1989, abandoned.

[30] Foreign Application Priority Data

Mar. 31, 1988 [JP] Japan ................................ 63-76455

[51] Int. Cl.[5] ......................... F27D 3/00; F27B 9/12; F27B 9/00; B32B 3/12

[52] U.S. Cl. ....................................... 432/11; 432/12; 432/13; 432/18; 428/116; 264/63; 264/66

[58] Field of Search .............. 432/128, 129, 133, 136, 432/137, 141, 143, 144, 145, 146, 149, 150, 152, 153, 11, 12, 13, 18; 264/64, 59, 63, 66; 428/116

[56] References Cited

U.S. PATENT DOCUMENTS

| | | | |
|---|---|---|---|
| 4,191,721 | 3/1980 | Pasco et al. | 264/66 X |
| 4,247,500 | 1/1981 | Dixon et al. | 264/63 |
| 4,283,360 | 8/1981 | Henmi et al. | 264/63 |
| 4,293,513 | 10/1981 | Langley et al. | 428/116 X |
| 4,455,180 | 6/1984 | Hillman et al. | 264/63 X |
| 4,518,704 | 5/1985 | Okabayashi et al. | 428/116 X |
| 4,624,812 | 11/1986 | Farrow et al. | 264/63 |
| 4,704,242 | 11/1987 | Bandyopadhyay et al. | 264/63 X |
| 4,713,206 | 12/1987 | Matsuhisa et al. | 264/63 X |
| 4,784,812 | 11/1988 | Saitoh et al. | 264/63 |
| 4,832,887 | 5/1989 | Zeibig | 264/63 |

FOREIGN PATENT DOCUMENTS 3517866 11/1986 Fed. Rep. of Germany .

*Primary Examiner*—Henry A. Bennet
*Assistant Examiner*—Christopher B. Kilner
*Attorney, Agent, or Firm*—Parkhurst, Wendel & Rossi

[57] ABSTRACT

A process for firing ceramic shaped bodies is disclosed, which comprises the step of making a heating temperature in a temperature range up to a decomposing temperature of a shaping aid contained in the ceramic shaped body smaller than that in a temperature range from the decomposing temperature to a firing temperature. A tunnel kiln is also disclosed, which comprises a preheating zone, a firing zone, a waste heat zone, combustion burners provided at the firing zone, an exhaust means provided at an inlet side of the preheating zone for evacuating combustion gases from the combustion burners outside the kiln, and another exhaust means provided at an outlet side of the preheating zone for evacuating the combustion gases outside the kiln.

2 Claims, 3 Drawing Sheets

PROCESS FOR FIRING CERAMIC SHAPED BODIES AND A TUNNEL KILN USED THEREFOR

This ia a continuation of application Ser. No. 07/330,906 filed Mar. 31, 1989 abandoned.

BACKGROUND OF THE INVENTION (1) Field of the Invention

The present invention relates to a process for firing ceramic shaped bodies, particularly, ceramic honeycomb structural bodies, and to a firing kiln adapted for effecting such a process.

(2) Related Art Statement

Heretofore, a tunnel kiln as shown in FIG. 4 has been used for firing ceramic honeycomb structural bodies from the standpoint of mass productivity. The tunnel kiln is generally constituted by a preheating zone 11, a firing zone 12, and a waste heat zone 13. Combustion gases generated from combustion burners 14 provided at the firing zone 12 are evacuated outside the kiln through the preheating zone 11 by suction forces of an exhaust fan 15 provided at a low temperature section of the preheating zone 11 on the inlet side. In the tunnel kiln of this structure, as shown in FIG. 5, the firing condition is constituted by a temperature-rising section, a sintering section in which a constant temperature is maintained, and a temperature-descending section.

However, if ceramic shaped bodies are fired under such firing conditions, firing cracks or deformation occur in some of fired products. In particular, occurrence of such defects is more frequent in the case of ceramic honeycomb structural bodies having a number of through holes.

SUMMARY OF THE INVENTION

It is an object of the present invention to solve the above-mentioned problems, and to provide a firing process which produces fired products free from defects, as well as a tunnel kiln used therefor.

The ceramic-firing process according to the present invention is characterized in that a heating rate below a decomposing temperature of a shaping aid for ceramic shaped bodies is set smaller than that in a range from the decomposing temperature to a sintering temperature.

The firing kiln according to the present invention is a tunnel kiln which is constituted by a preheating zone, a firing zone, and a waste heat zone, and in which combustion gases from combustion burners provided at the firing zone are evacuated outside the kiln by evacuating means provided at an inlet side of the preheating zone, and is characterized in that an exhaust pipe is provided at a high temperature section of an outlet side of the preheating zone for evacuating the combustion gases outside the kiln.

In the above construction, since the heating rate below the decomposing temperature of the shaping aid is slow, thermal decomposition of the shaping aid is made uniform so that neither firing cracks nor firing deformation occur.

Further, the above ceramic-firing conditions can be attained merely by providing the exhaust means at the high temperature section of the preheating zone on the outlet side.

These and other objects, features and advantages of the invention will be appreciated upon reading the following description of the invention when taken in conjunction with the attached drawings, with the understanding that some modifications, variations, and changes of the same could be made by a skilled person in the art to which the invention pertains, without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

The ceramic-firing process and apparatus according to the present invention are based on knowledge obtained by examining conventional firing kilns and their firing conditions.

Figure 6:
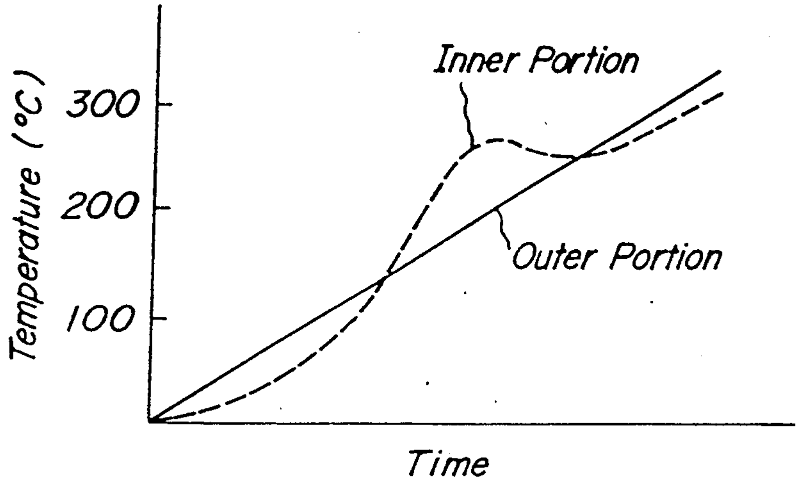
FIG 6 PRIOR ART
FIG. 6 is a diagram illustrating differences in temperature between an inner portion and an outer portion of a fired product obtained by the conventional process.

That is, the temperature distribution in the outer surface and the inside of the ceramic shaped body under the conventional firing conditions is that a shaping aid contained in the shaped body is thermally decomposed at 150° to 300° C. Owing to this, heat is first generated at the outer periphery of the ceramic shaped body, and then generated inside. Although heat generated at the outer periphery is easily dissipated, heat generated inside is accumulated without being dissipated. Therefore, it has been determined that as shown in FIG. 6, temperature differences occur between the outer surface and the inside of the ceramic shaped body so that firing cracks are likely to occur. In particular, since the extrusion shaping is employed for the ceramic honeycomb shaped bodies from the structural standpoint, a considerable amount of a shaping aid is contained. It has also been determined that because partition walls constituting through holes are thin, firing cracks or thermal deformation is likely to occur due to slight changes in temperature distribution.

Figure 1:
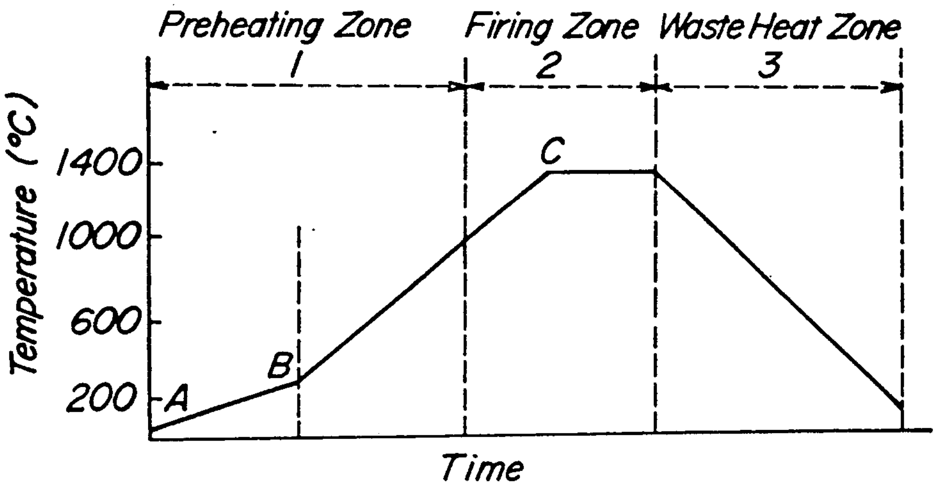
FIG. 1 is a diagram showing a firing condition of an example of the ceramic-firing process according to the present invention.

Therefore, FIG. 1 shows the relationship between the firing temperature and time, according to the ceramic-firing process of the present invention, a heating rate in a temperature range from a firing-starting point A to a point B, at which a shaping aid contained in a ceramic shaped body is thermally decomposed is made smaller than that in a temperature range from the point B to a sintering temperature C.

The shaping aid may involve binders such as methyl cellulose, carboxylmethyl cellulose, polyvinyl alcohol, starch paste, etc., a surface active agent, a lubricant such as wax, and the like. Therefore, the thermally decomposing temperature is specifically determined depending upon the kinds of shaping aid, and therefore, the heating rate can be determined based on the dimension and shape of the shaped body and the content of the shaping aid.

For instance, when a body in which a shaping aid mainly composed of methyl cellulose is added to raw materials of talc, kaoline and alumina is extruded in the form of a honeycomb structure, a cordierite ceramic honeycomb structural body can be obtained by heating the shaped body such that the heating rate is set at 80° to 90° C./h in a range up to the decomposing temperature, 200°C., of methyl cellulose, and at 100° to 120° C./h in a range from 200° C. to 1,400° C. at which the shaped body is maintained during sintering.

The heating rate in the temperature range from the thermally decomposing temperature B to the sintering temperature C is set such that delay in raising the temperature from A to B is complemented to make up the firing temperature.

Next, the firing kiln according to the present invention will be explained in more detail below with reference to the attached drawings.

Figure 2:
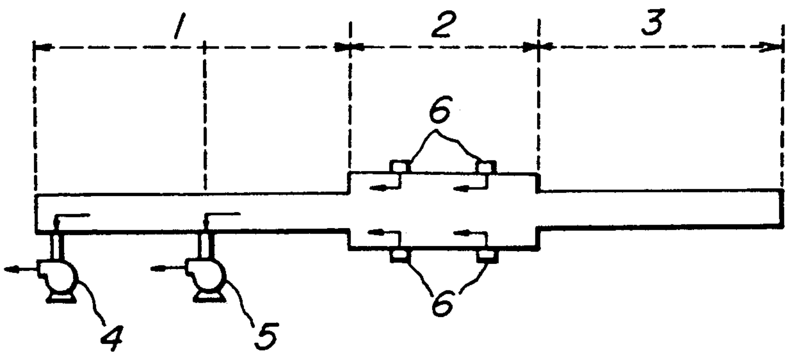
FIG. 2 is a side view of a tunnel kiln as an embodiment of the present invention.

FIG. 2 is a concept view illustrating the construction of an embodiment of the tunnel kiln for effecting the firing process according to the present invention. In this embodiment, the tunnel kiln is constituted by a preheating zone 1, a firing zone 2 and a waste heat zone 3. An exhaust fan 4 is provided at an inlet side of a low temperature section of the preheating zone 1 for evacuating a combustion waste gas. Another exhaust fan 5 is provided at an outlet side of a high temperature section of the preheating zone 1 for evacuating the high temperature gas.

When the preheating zone 1 is constituted as above, the combustion gases generated by burners 6 positioned in the firing zone 2 are sucked by the exhaust fan 4 at the inlet side of the preheating zone 1 to generate the combustion gas stream, while the high temperature gas is sucked midway of this stream by means of the exhaust fan 5. Thereby, the firing condition shown in FIG. 1 is attained for the tunnel kiln. By varying the exhaust amount of the high temperature gas through the exhaust fan 5, the heating rate can arbitrarily be varied. As a result, the heating rate of the shaping aid in the ceramic shaped body to be fired can be retarded near the decomposing temperature thereof so that temperature differences between the inside and the outer portion of the shaped body due to the decomposition of the shaping aid can be diminished.

Figure 3:
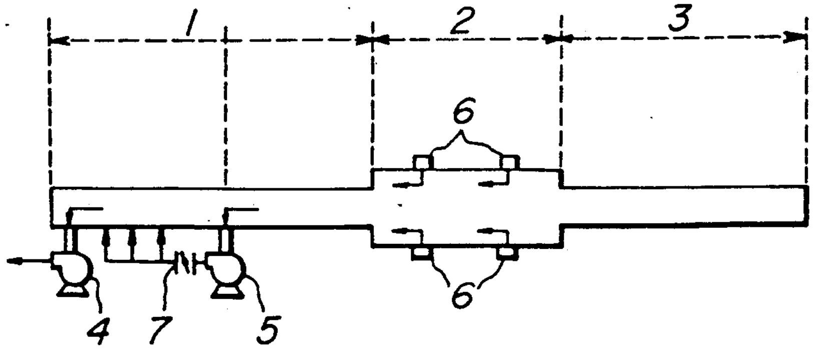
FIG. 3 is a concept view illustrating the construction of another embodiment of the tunnel kiln for effecting the firing process according to the present invention.
Figure 4:
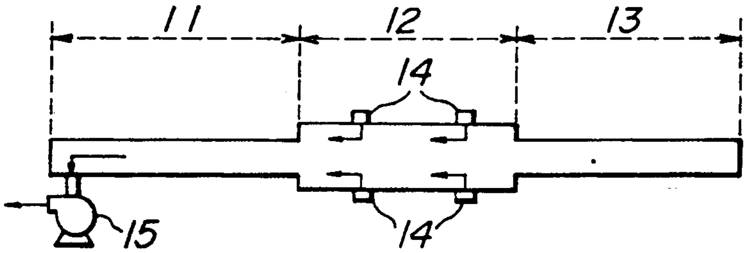
FIG 4 PRIOR ART
FIG. 4 is a concept view illustrating the construction of a tunnel kiln for effecting a conventional firing process.
Figure 5:
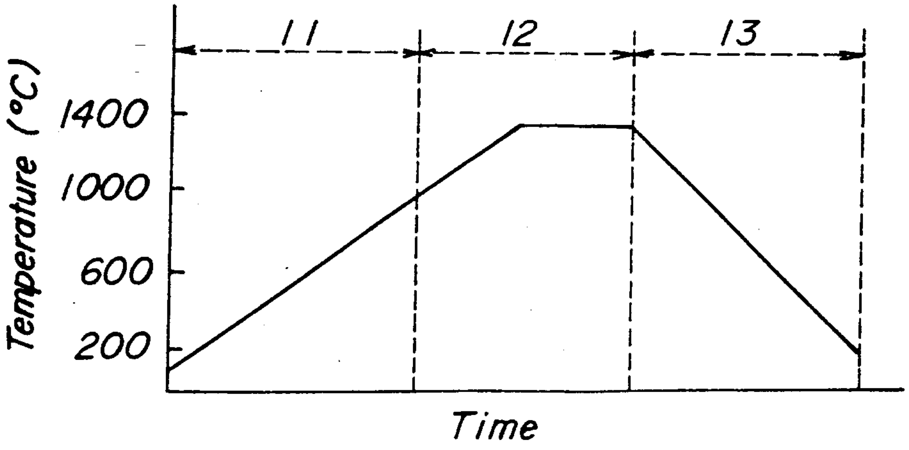
FIG 5 PRIOR ART
FIG. 5 is a diagram illustrating an example of a heat curve of the tunnel kiln shown in FIG. 4.

FIG. 3 is a concept view illustrating another tunnel kiln for effecting the firing process according to the present invention. The same reference numerals in FIG. 2 are given to the same or similar parts in FIG. 4 as in the embodiment of FIG. 2, and explanation thereof is omitted. The embodiment in FIG. 3 differs from that of FIG. 1 in that a high temperature gas at a high temperature section of a preheating zone 1 is evacuated by an exhaust fan 5, and supplied to a low temperature section of the preheating zone 1 through a temperature adjusting means 7.

When a great amount of the combustion gas is evacuated outside the kiln by means of the exhaust fan 5 to decrease the temperature-rising rate in the preheating zone as a temperature zone in which the shaping aid is decomposed, an amount of the gas circulated to the side of the exhaust fan 4 on the inlet side of the tunnel kiln decreases.

When the amount of the circulated gas decreases, the circulated gas tends to pass on the upper side of the kiln, that is, on a ceiling side of the kiln, because the temperature of the circulated gas is high. As a result, temperature difference occurs between the kiln bottom portion and the kiln upper portion, so that firing cracks or deformation occur in the fired shaped body due to such a temperature difference.

In order to prevent this phenomenon, the gas once discharged outside the kiln by the exhaust fan 5 is circulated to the low temperature section of the preheating zone, thereby removing the temperature difference between the upper portion and the bottom portion of the kiln.

The temperature of the combustion gas is controlled by a temperature adjuster 7 such as a heat exchanger or by changing the amount of the gas to be circulated. In FIG. 3, the temperature adjuster 7 is depicted to have a flow-controlling function, but a flow controller may be provided separately from the temperature adjuster.

In the above construction, the temperature of the preheating zone can be made uniform. Also, incoming and outgoing heat can be improved by recycling the exhaust gas.

As a matter of course, the present invention is not limited to the above-mentioned embodiments, but various modifications, variations and changes of the same could be made. For instance, although a single exhaust fan is provided in each of the low and high temperature sections of the preheating zone at the inlet side and the outlet side, respectively, in the above-mentioned embodiments, the number of exhaust fans is not limited to one.

As is clear from the foregoing explanation, according to the firing process of the present invention, since the thermal decomposition of the shaping aid gradually, neither firing cracks nor deformation occurs. Furthermore, in the tunnel kiln according to the present invention, the exhaust fan is provided at the high temperature section of the preheating zone at the outlet side for evacuating a given amount of the high temperature gas through the exhaust fan. Thereby, desired firing conditions can be attained during the firing. Consequently, since the temperature difference between the inner portion and the outer portion of the shaped body during the firing is removed, a fired product free from cracks can be obtained.

What is claimed is:

1. A method of firing cordierite ceramic honeycomb shaped bodies to produce substantially crack-free sintered bodies, the method sequentially comprising the following steps:

heating said bodies at a first heating rate between room temperature and a decomposition temperature of a shaping aid contained in said bodies; and heating said bodies at a second heating rate between said decomposition temperature and a sintering temperature, said first heating rate being less than said second heating rate;

wherein said bodies are heated at a constantly changing temperature between said room temperature and said sintering temperature.

2. The method of claim 1, wherein aid first heating rate ranges from 80°-90° C./h and said second heating rate ranges from 100°-120° C./h.

* * * * *